Sept. 13, 1966 SAKUJI YAMAGUCHI 3,272,955
METHOD OF COUPLING HIGH FREQUENCY ELECTRIC CIRCUIT
Filed Feb. 7, 1964
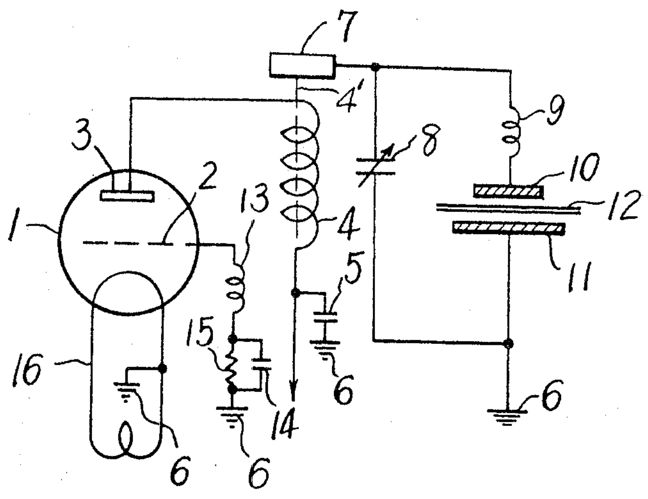
INVENTOR
Sakuji Yamaguchi
BY Pierce, Scheffler & Parker
ATTORNEYS United States Patent Office 3,272,955
Patented Sept. 13, 1966

3,272,955

METHOD OF COUPLING HIGH FREQUENCY ELECTRIC CIRCUIT

Sakuji Yamaguchi, 12 1-chome, Enjo-cho, Showa-ku, Nagoya, Japan

Filed Feb. 7, 1964, Ser. No. 343,259
Claims priority, application Japan, Feb. 13, 1963, 38/6,942
2 Claims. (Cl. 219—10.53)

This invention relates to improvements in a circuit for coupling high frequency electric circuits and is applicable to dielectric heating, radio and other electric signal transmitting apparatuses and other various purposes.

There are many kinds of high frequency dielectric heating circuits, in which coils or capacitors are generally used for the coupling between the tank circuits and the heating circuits. Conventionally used load circuits for high frequency dielectric heating have been either parallel resonant circuits consisting of an inductance coil and a capacitor or a re-entrant cylindrical cavity resonator. The invention does not concern the oscillating circuit itself, but it is mainly based on the coupling between the oscillator and the load circuit. It is a common practice to use two coils and a capacitor for coupling two circuits. But the invention is entirely different from such known devices, and is characterized in that a flat metal plate is placed on the center, i.e. axial line of a tank coil in spaced relation thereto and is connected to a load circuit having at least a parallel combination of a variable tuning capacitor and a load impedance.

It might be supposed that the flat metallic plate placed on the axial line of the tank coil would disturb the generation of the high frequency electric wave. But actually, the applicant has ascertained that it has the function of inducing high frequency electric energy, and if it is connected to the variable capacitor of the load circuit having welding electrodes in parallel with said capacitor, then it establishes a resonant circuit enabling welding of synthetic fiber fabrics such as vinyl sheets located between the electrodes by inducing high frequency electric wave energy from the tank circuit.

In order that the invention may be readily carried into effect, it will now be described in detail, with reference to the accompanying drawing, of which a single figure is a diagrammatic circuit arrangement illustrating an embodiment of the invention.

Referring to the drawing, reference numeral 1 designates an oscillator tube, 2 its grid, 3 an anode, 4 a tank coil of the oscillator circuit, 5 by-pass capacitor, and 6 all earth connections.

According to the invention, a flat metal plate 7, is placed on and transverse to the axial line 4' of the tank coil 4 in spaced relation thereto and is connected to a tuning variable capacitor 8 and the flat metal plate 7 is also connected to a coil 9 in the load circuit, then to an upper electrode 10 which cooperates with the lower electrode 11 of a high frequency welding apparatus connected to one side of the capacitor 8. A sample such as vinyl sheets to be electrically welded together is indicated at 12. Numeral 13 designates a grid tuning coil, 14 a (titanium) capacitor for grounding, 15 a grid leak resistor connected in parallel to the capacitor 14, and 16 a filament of the oscillator tube 1.

The above described oscillator circuit as shown in the drawing is an inductance type Tuned Plate-Tuned Grid for example, but any suitable type of oscillator such as Hartley or a Colpitts type may be used.

The essential feature of the invention lies in that the coupling between the oscillator tank coil 4 and the load circuit is achieved by the provision of a high frequency electric energy collecting flat metal plate 7 arranged on the axial line of coil 4 of the oscillator circuit in spaced relation thereto.

The distance between the flat metal plate 7 and the coil 4 may be about one half of the diameter of the coil. The stray capacity between the coil and the flat metal plate is approximately 1 to 5 pf., which is too small to make a good coupling capacitance. That is to say, even if the load circuit is not grounded at 6 as shown in the drawing, the system can work if the electrode 11 is connected to the end of the tuning capacitor 8. The expected performance can not be achieved by coupling the end of the tank coil to the tuning capacitor using a coupling capacitor.

The principle of this method is yet unknown, and it is difficult to establish an equivalent circuit. But the flat metal plate is considered to collect or absorb the high frequency electric wave energy and lead it to the load circuit. In other words, when the electric wave energy impinges against the surface of the flat metal plate, a certain amperage of electric current is induced on the flat metal plate and this current is conducted to the load circuit to be used for sealing.

The construction of this circuit is very simple and the flat metal plate can be formed at a lower cost and the loss of the electric power is very small as it absorbs the required power only. Almost no variation of frequency occurs by changing the capacity of the tuning variable capacitor or by varying the load from the full to zero. Moreover the leakage intensity of the wave is almost always the mean value whether this device is at full load or at no load.

The movement of the current meter is ideal and the absorptive phenomenon at the sealing time is clearly shown. The coupling circuit of the invention can also be utilized for communicating devices, such as circuits and vacuum tubes.

What I claim is:

1. A circuit for coupling a high frequency oscillatory circuit to a load circuit which comprises a flat metal plate located on and transverse to the axial line of a tank coil of said oscillatory circuit and in spaced relation thereto, and a connection between said metal plate and the load circuit which includes a paralleled circuit combination of a variable tuning capacitor and a load impedance.

2. A system for welding synthetic fiber fabrics by using high frequency dielectric heating, which comprises a flat metal plate located on and transverse to the axial line of the tank coil of a high frequency oscillatory circuit and in spaced relation thereto, and a connection between said metal plate and a dielectric heating load circuit which comprises a tunable capacitor in parallel with a pair of welding electrodes between which the synthetic fiber fabrics are placed for welding.

References Cited by the Examiner

UNITED STATES PATENTS

| | | | |
|---|---|---|---|
| 1,688,713 | 10/1928 | Hund | 333—24 |
| 2,554,087 | 5/1951 | Breimer | 219—10.75 |
| 2,662,162 | 12/1953 | Blok | 219—10.75 |

RICHARD M. WOOD, *Primary Examiner.*

L. H. BENDER, *Assistant Examiner.*